United States Patent
Heo et al.

(10) Patent No.: US 9,282,559 B2
(45) Date of Patent: *Mar. 8, 2016

(54) APPARATUS AND METHOD FOR ALLOCATING RESOURCES IN A SINGLE CARRIER-FREQUENCY DIVISION MULTIPLE ACCESS SYSTEM

(71) Applicant: Samsung Electronics Co., Ltd., Gyeonggi-do (KR)

(72) Inventors: Youn-Hyoung Heo, Gyeonggi-do (KR); Ju-Ho Lee, Gyeonggi-do (KR); Sang-Min Ro, Seoul (KR); Joon-Young Cho, Gyeonggi-do (KR); Yun-Ok Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,733

(22) Filed: Sep. 22, 2015

(65) Prior Publication Data

US 2016/0014777 A1   Jan. 14, 2016

Related U.S. Application Data

(63) Continuation of application No. 14/330,809, filed on Jul. 14, 2014, which is a continuation of application No. 11/971,692, filed on Jan. 9, 2008, now Pat. No. 9,072,096.

(30) Foreign Application Priority Data

Jan. 9, 2007    (KR) .................. 10-2007-0002657
Jun. 14, 2007   (KR) .................. 10-2007-0058331
Aug. 9, 2007    (KR) .................. 10-2007-0080204
Dec. 7, 2007    (KR) .................. 10-2007-0126476

(51) Int. Cl.
H04B 7/208    (2006.01)
H04W 72/04    (2009.01)
H04B 1/7143   (2011.01)

(52) U.S. Cl.
CPC ......... *H04W 72/0446* (2013.01); *H04B 1/7143* (2013.01)

(58) Field of Classification Search
None
See application file for complete search history.

(56) References Cited

U.S. PATENT DOCUMENTS 5,418,571 A    5/1995   Ghanbari
6,714,526 B2   3/2004   Wei et al.

(Continued)

FOREIGN PATENT DOCUMENTS

CA    2 655 865    1/2008
CN    1385975      12/2002

(Continued)

OTHER PUBLICATIONS

Elkashlan et al., "Channel Aware Frequency Hopping Multiple Access Scheme", Electronics Letters, vol. 39, No. 25, Dec. 11, 2003.

(Continued)

*Primary Examiner* — Thai Nguyen
(74) *Attorney, Agent, or Firm* — The Farrell Law Firm, P.C.

(57) ABSTRACT

Methods and apparatuses are provided for transmitting data by a user equipment (UE) in a communication system. Resource information is received from a node B. A hopping parameter is determined based on a sequence defined by a cell specific seed. A mirroring parameter is determined based on the sequence defined by the cell specific seed. A resource for data transmission is determined based on the resource information, the hopping parameter, and the mirroring parameter. The data is transmitted using the resource for data transmission. The hopping parameter and the mirroring parameter are determined at a slot.

20 Claims, 19 Drawing Sheets

(56) References Cited

U.S. PATENT DOCUMENTS

| | | | |
|---|---|---|---|
| 7,724,777 | B2 | 5/2010 | Sutivong et al. |
| 2004/0120415 | A1 | 6/2004 | Song et al. |
| 2005/0163194 | A1* | 7/2005 | Gore .................... H04B 1/7143 375/132 |
| 2008/0089286 | A1* | 4/2008 | Malladi ................ H04B 1/7143 370/330 |
| 2008/0095277 | A1 | 4/2008 | Cheng |
| 2008/0101319 | A1* | 5/2008 | Rao ....................... H04L 1/0001 370/342 |

FOREIGN PATENT DOCUMENTS

| | | |
|---|---|---|
| CN | 1809047 | 7/2006 |
| EP | 1 043 861 | 10/2000 |
| JP | 2000-286822 | 10/2000 |
| JP | 2006-148220 | 6/2006 |
| JP | 2009-544189 | 12/2009 |
| RU | 2 120 702 | 10/1998 |
| WO | WO 02/099978 | 12/2002 |
| WO | WO 2006/004968 | 1/2006 |
| WO | WO 2006/007527 | 1/2006 |
| WO | WO 2006/062355 | 6/2006 |
| WO | WO 2006/099547 | 9/2006 |
| WO | WO 2006/138206 | 12/2006 |
| WO | WO 2008/008748 | 1/2008 |

OTHER PUBLICATIONS

3GPP TSG RAN WGI #46, R1-062303, "Frequency Hopping in Uplink Localized Transmission", Aug. 28-Sep. 1, 2006.

3GPP TSG RAN WGI Meeting #46bis, R1-062497, "Link Performance of Frequency Hopping in LTE Uplink Localized Transmission", Oct. 9-13, 2006.

Myung et al.: "Single Carrier FDMA for Uplink Wireless Transmission", IEEE Vehicular Technology Magazine, vol. 1, Issue 3, Sep. 2006.

Chinese Office Action dated Dec. 24, 2014 issued in counterpart Appln. No. 201310052672.2.

Edward Kasem et al., "The Evolution of LTE to LTE-Advanced and the Corresponding Changes in the Uplink Reference Signals", Elektrorevue vol. 3, No. 2, Jun. 2012, 7 pages.

U.S. Office Action dated Jun. 17, 2015 issued in counterpart U.S. Appl. No. 14/570,411, 13 pages.

* cited by examiner

APPARATUS AND METHOD FOR ALLOCATING RESOURCES IN A SINGLE CARRIER-FREQUENCY DIVISION MULTIPLE ACCESS SYSTEM

PRIORITY

This application is a Continuation Application of U.S. application Ser. No. 14/330,809, filed in the U.S. Patent and Trademark Office (USPTO) on Jul. 14, 2014, which is a Continuation Application of U.S. application Ser. No. 11/971,692, filed in the USPTO on Jan. 9, 2008, now U.S. Pat. No. 9,072,096, issued on Jun. 30, 2015, which claims priority under 35 U.S.C. §119(a) to a Korean Patent Application filed in the Korean Intellectual Property Office on Jan. 9, 2007 and assigned Serial No. 10-2007-0002657, a Korean Patent Application filed in the Korean Intellectual Property Office on Jun. 14, 2007 and assigned Serial No. 10-2007-0058331, a Korean Patent Application filed in the Korean Intellectual Property Office on Aug. 9, 2007 and assigned Serial No. 10-2007-0080204, and a Korean Patent Application filed in the Korean Intellectual Property Office on Dec. 7, 2007 and assigned Serial No. 10-2007-0126476, the entire disclosures of which are incorporated herein by reference.

BACKGROUND OF THE INVENTION

1. Field of the Invention

The present invention relates to a method and apparatus for efficiently allocating control channel transmission resources when a packet data channel and a control channel are transmitted in the same transmission period in a Single Carrier-Frequency Division Multiple Access (SC-FDMA) wireless communication system.

2. Description of the Related Art

FIG. 1 is a block diagram of a transmitter in a Localized FDMA (LFDMA) system being a kind of SC-FDMA system. While the transmitter is configured so as to use Discrete Fourier Transform (DFT) and Inverse Fast Fourier Transform (IFFT) in the illustrated case of FIG. 1, any other configuration is available to the transmitter.

Referring to FIG. 1, the use of DFT and IFFT facilitates changing LFDMA system parameters with low hardware complexity. Concerning the difference between Orthogonal Frequency Division Multiplexing (OFDM) and SC-FDMA in terms of transmitter configuration, the LFDMA transmitter further includes a DFT precoder 101 at the front end of an IFFT processor 102 that is used for multi-carrier transmission in an OFDM transmitter. In FIG. 1, Transmission (TX) modulated symbols 103 are provided in blocks to the DFT precoder 101. DFT outputs are mapped to IFFT inputs in a band comprised of successive subcarriers. A mapper 104 functions to map the transmission modulated symbols to an actual frequency band.

FIG. 2 illustrates an exemplary data transmission from User Equipments (UEs) in their allocated resources in a conventional SC-FDMA system.

Referring to FIG. 2, one Resource Unit (RU) 201 is defined by one or more subcarriers in frequency and one or more SC-FDMA symbols in time. For data transmission, two RUs marked with slashed lines are allocated to UE1 and three RUs marked with dots are allocated to UE2.

The RUs in which UE1 and UE2 transmit data are fixed in time and successive in predetermined frequency bands. This resource allocation scheme or data transmission scheme selectively allocates frequency resources that offer a good channel status to each UE, to thereby maximize system performance with limited system resources. For example, the slashed blocks offer relatively better radio channel characteristics to UE1 than in other frequency bands, whereas the dotted blocks offer relatively better radio channel characteristics to UE2. The selective allocation of resources with a better channel response is called frequency selective resource allocation or frequency selective scheduling. As with uplink data transmission from a UE to a Node B as described above, the frequency selective scheduling applies to downlink data transmission from the Node B to the UE. On the downlink, the RUs marked with slashed lines and dots represent resources in which the Node B transmits data to UE1 and UE2, respectively.

However, the frequency selective scheduling is not always effective. For a UE that moves quickly and thus experiences a fast change in channel status, the frequency selective scheduling is not easy. More specifically, although a Node B scheduler allocates a frequency band in a relatively good channel status to a UE at a given time, the UE is placed in a channel environment that has already changed significantly when the UE receives resource allocation information from the Node B and is to transmit data in the allocated resources. Hence, the selected frequency band does not ensure the relatively good channel status for the UE.

Even in a Voice over Internet Protocol (VoIP)-like service that requires a small amount of frequency resources continuously for data transmission, if the UE reports its channel status for the frequency selective scheduling, signaling overhead can be huge. In this case, it is more effective to use frequency hopping rather than the frequency selective scheduling.

FIG. 3 illustrates an exemplary frequency hopping in a conventional FDMA system.

Referring to FIG. 3, frequency resources allocated to a UE for data transmission change over time. The frequency hopping has the effect of randomizing channel quality and interference during data transmission. As data is transmitted in frequency resources that vary over time, the data has different channel characteristics and a different UE in a neighbor cell interferes with the data at each time point, thus achieving diversity.

However, the frequency hopping is not viable when RUs hop in independent patterns in the SC-FDMA system as illustrated in FIG. 3. For instance, if RUs 301 and 302 are allocated to different UEs, it does not matter. Yet, if both the RUs 301 and 302 are allocated to a single UE, they hop to the positions of RUs 303 and 304 by frequency hopping at the next transmission point. Since the RUs 303 and 304 are not successive, the UE cannot transmit data in these two RUs.

In this context, to achieve frequency diversity in the SC-FDMA system, mirroring is proposed to substitute for the frequency hopping.

FIG. 4 illustrates mirroring.

Conventionally, an RU moves symmetrically with respect to the center frequency of a total frequency band available for data transmission. For example, an RU 401 is mirrored to an RU 403 and an RU 402 to an RU 404 at the next transmission time in Cell A. In the same manner, an RU 405 is mirrored to an RU 406 at the next transmission time in Cell B. The mirroring enables successive RUs to hop as successive, thereby satisfying the single carrier property during frequency hopping.

A shortcoming with the frequency hopping with frequency diversity is that the hopping pattern is fixed because there is no way to move RUs without mirroring with respect to a center frequency. This means that frequency diversity is achieved to a certain degree but interference randomization is difficult. As an RU hopped to the opposite returns to its original position by mirroring, only one RU hopping pattern is available. Therefore, even when a plurality of cells exist, each cell cannot have a different pattern.

Referring to FIG. 4, if the RU 402 marked with dots is allocated to a UE in Cell A and the RU 405 marked with single-slashed lines is allocated to a UE in Cell B for a predetermined time, the UE of Cell A interferes with the UE of Cell B because only one hopping pattern is available in the mirroring scheme. If the UE of Cell B is near to Cell A, it causes great interference to UEs in Cell A. As a result, the UE of Cell A using RUs marked with dots suffers from reception quality degradation.

SUMMARY OF THE INVENTION

An aspect of the present invention is to address at least the problems and/or disadvantages and to provide at least the advantages described below. Accordingly, an aspect of the present invention is to provide a method and apparatus for allocating resources to randomize interference between neighbor cells when mirroring is adopted to achieve frequency diversity.

Another aspect of the present invention is to provide a method for determining whether to turn on or off mirroring at each hopping time according to a different mirroring on/off pattern for each cell, and a transmitting/receiving apparatus using the same.

A further aspect of the present invention is to provide a method for determining whether to turn on or off frequency hopping and mirroring at each hopping time according to a different pattern for each cell, and a transmitting/receiving apparatus using the same, when frequency hopping can be supported to increase a frequency diversity effect.

In accordance with an aspect of the present invention, a method is provided for transmitting data by a UE in a communication system. Resource information is received from a node B. Inter-subframe hopping is identified. A hopping parameter is determined. A mirroring parameter is determined. A resource for data transmission is determined based on the resource information, the hopping parameter, and the mirroring parameter. The data is transmitted using the resource for data transmission. The hopping parameter and the mirroring parameter are determined based on a same hybrid automatic retransmission request (HARQ) process at a subframe, if the inter-subframe hopping is identified.

In accordance with another aspect of the present invention, an apparatus of a UE is provided for transmitting data in a communication system. The apparatus includes a data transmission controller configured to receiving resource information from a node B, identify inter-subframe hopping, determine a hopping parameter, determine a mirroring parameter, and determine a resource for data transmission based on the resource information, the hopping parameter, and the mirroring parameter. The apparatus also includes a transmitter configured to transmit the data using the resource for data transmission. The hopping parameter and the mirroring parameter are determined based on a same HARQ process at a subframe, if the inter-subframe hopping is identified.

In accordance with a further aspect of the present invention, a method is provided for receiving data by a node B in a communication system. Resource information is transmitted to a UE. Inter-subframe hopping is identified. A hopping parameter is determined. A mirroring parameter is determined. A resource for data transmission is determined based on the resource information, the hopping parameter, and the mirroring parameter. The data is received using the resource for data transmission. The hopping parameter and the mirroring parameter are determined based on a same HARQ process at a subframe, if the inter-subframe hopping is identified.

In accordance with another aspect of the present invention, an apparatus is provided for transmitting data. The apparatus includes a transceiver configured to transmit resource information to a UE and receive the data using a resource for data transmission. The apparatus also includes a controller configured to identify inter-subframe hopping, determine a hopping parameter, determine a mirroring parameter, and determine a resource for data transmission based on the resource information, the hopping parameter, and the mirroring parameter. The hopping parameter and the mirroring parameter are determined based on a same HARQ process at a subframe, if the inter-subframe hopping is identified.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for increasing the randomization of interference between cells when data is transmitted in a different RU at each predetermined time by a general frequency hopping or mirroring scheme to achieve frequency diversity while satisfying the single carrier property in an uplink SC-FDMA system.

For a better understanding of the present invention, data channels are defined as follows:

Frequency Scheduling (FS) band: a set of RUs allocated by frequency selective scheduling. They are successive or scattered.

Frequency Hopping (FH) band: a set of RUs transmitted to achieve frequency diversity. These RUs are not allocated by frequency selective scheduling. They are successive or scattered. An FH band can be comprised of one or more sub-FH bands.

Mirroring: RUs are symmetrically hopped from left to right and from right to left with respect to a center subcarrier or a center RU in a sub-FH band.

Hopping time: a time at which an allocated RU hops or is mirrored. Depending on how hopping or mirroring applies, the RU has the following period.

1. When intra-subframe hopping and inter-subframe hopping are supported, the period is a slot.

2. When only inter-subframe hopping is supported, the period is one sub-frame.

Embodiment 1

An exemplary embodiment of the present invention provides a method for turning mirroring on or off according to a different mirroring on/off pattern for each cell. Using different mirroring on/off patterns for different cells as much as possible and decreasing the probability of mirroring-on in cells at the same time maximize the effect of randomizing interference between cells.

Figure 1:
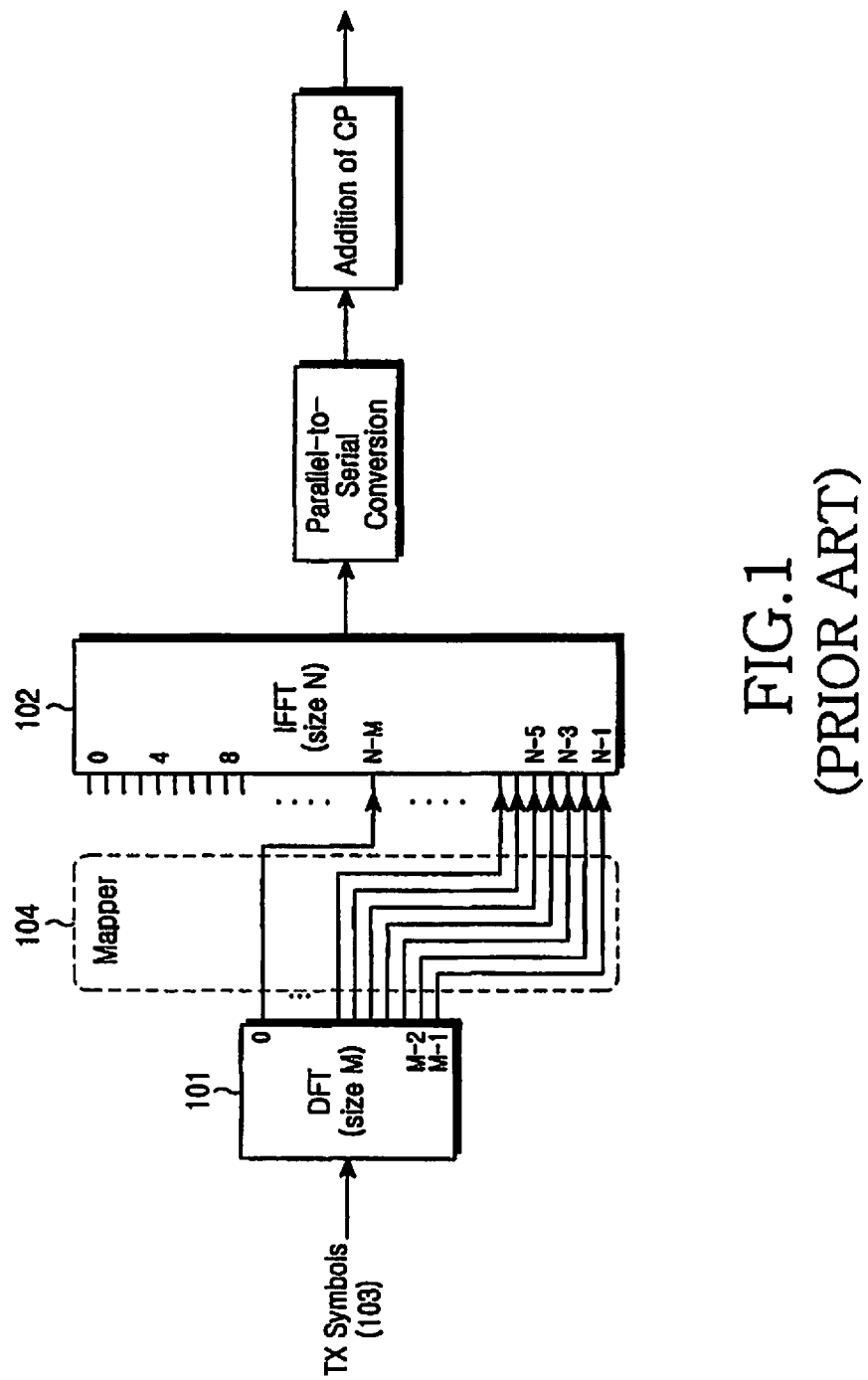
FIG. 1 is a block diagram of a transmitter in a conventional LFDMA system, which is a type of SC-FDMA system.
Figure 2:
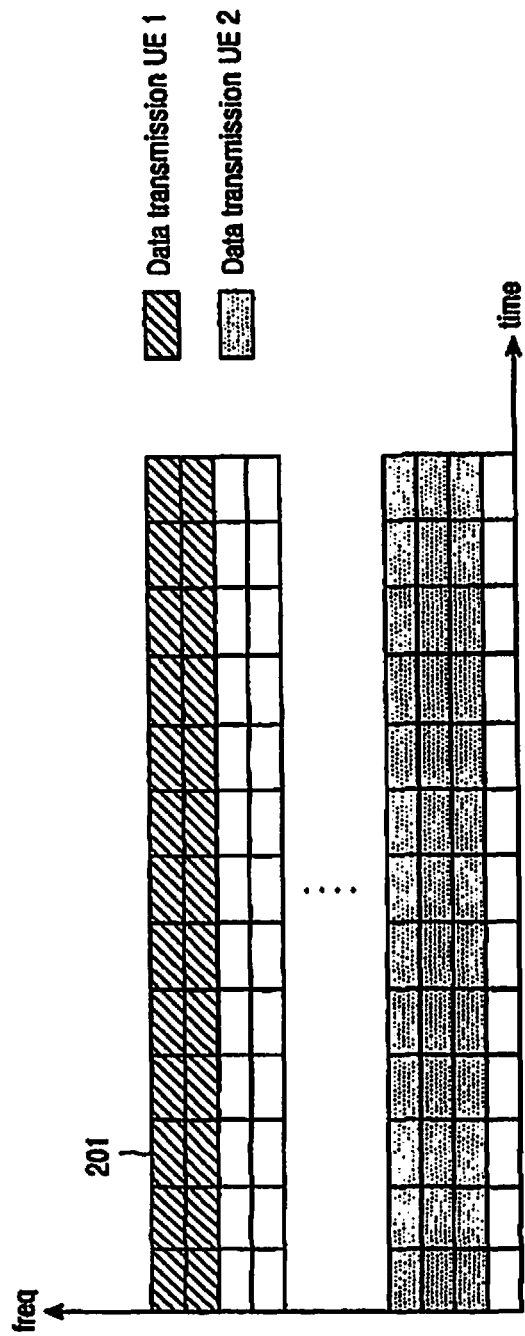
FIG. 2 illustrates an exemplary data transmission from UEs in their allocated resources in a conventional SC-FDMA system.
Figure 3:
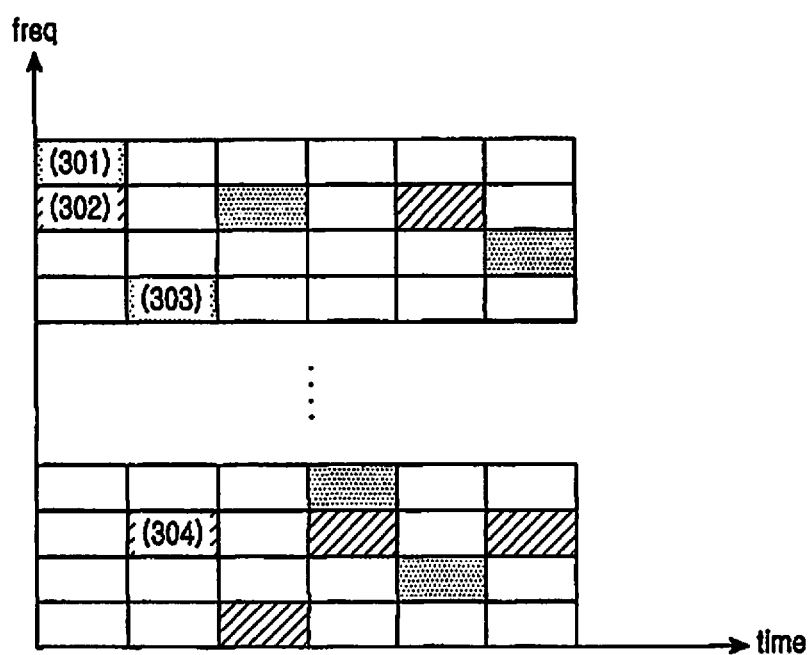
FIG. 3 illustrates an exemplary frequency hopping in a conventional FDMA system.
Figure 4:
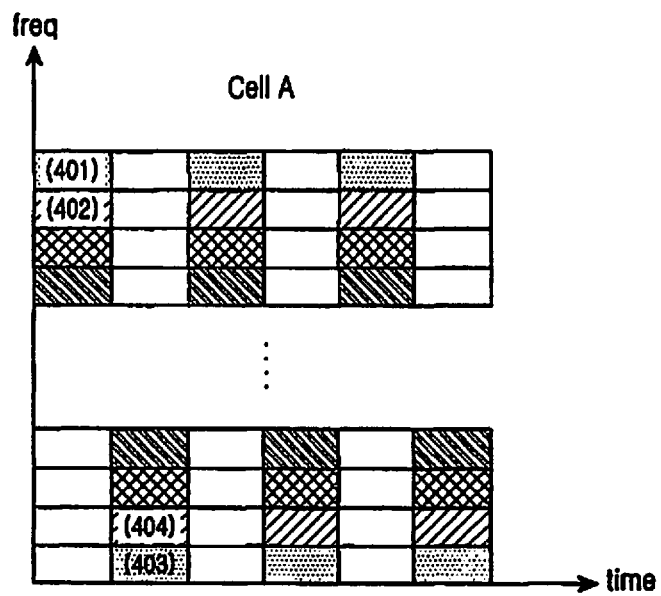
FIG. 4 illustrates mirroring.
Figure 4:
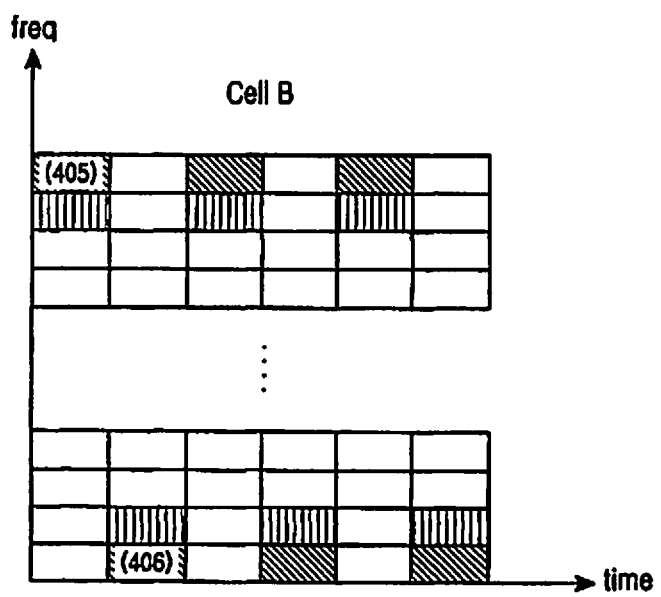
Figure 5A:
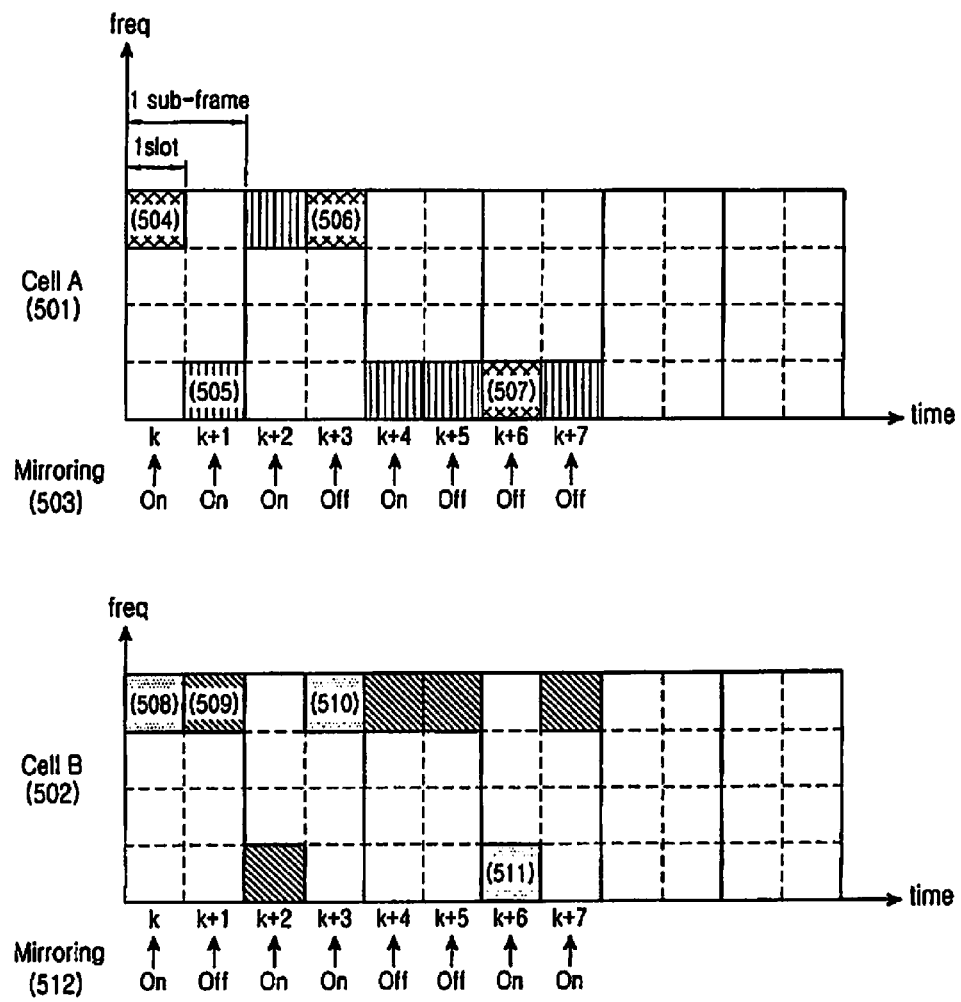
FIGS. 5A and 5B illustrate a method according to an exemplary embodiment of the present invention.
Figure 5B:
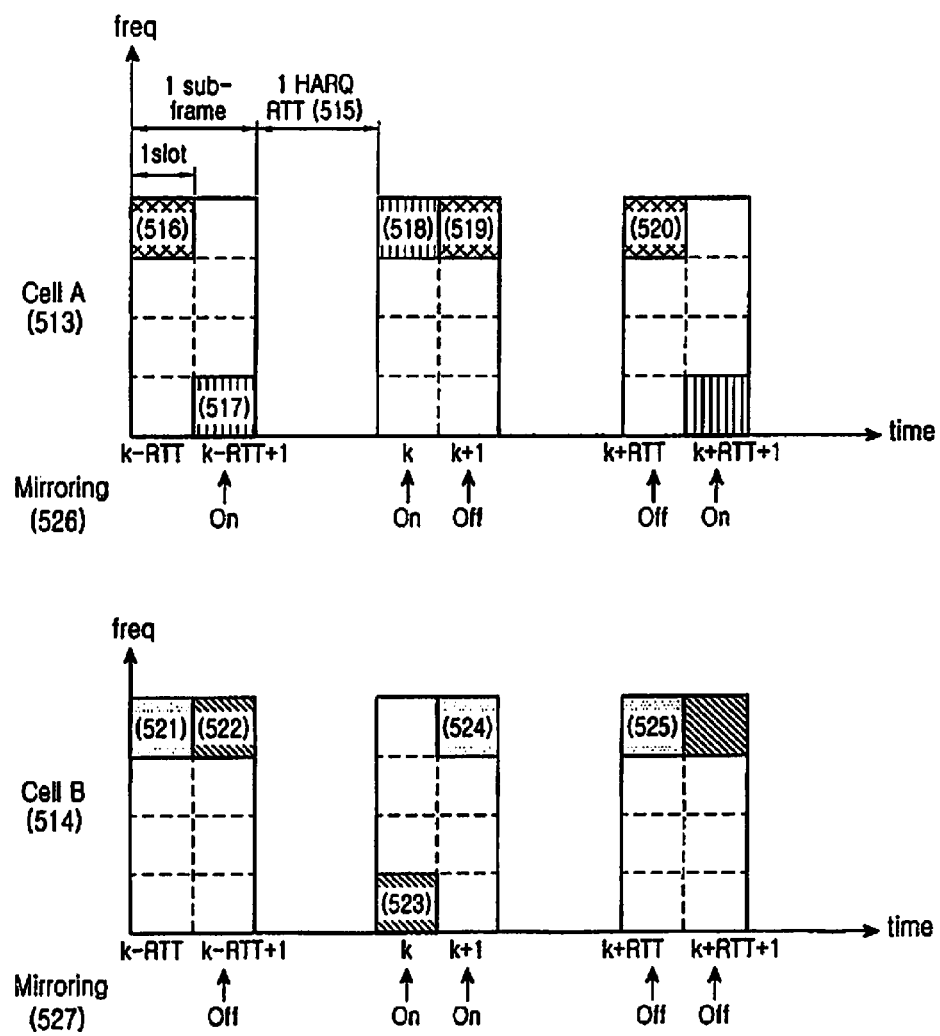

FIGS. 5A and 5B illustrate a method according to the exemplary embodiment of the present invention. FIG. 5A illustrates slot-based mirroring irrespective of Hybrid Automatic Repeat reQuest (HARQ) and FIG. 5B illustrates independent mirroring for each HARQ process.

Referring to FIG. 5A, there are cells 501 and 502 (Cell A and Cell B). As intra-subframe hopping is assumed, the hopping period is a slot. On a slot basis, mirroring is performed at each hopping time in a pattern 503 of on, on, on, off, on, off, off, off . . . in Cell A, and in a pattern 512 of on, off, on, on, off, off, on, on, . . . in Cell B.

In Cell A, an RU 504 is allocated to UE A at hopping time k. Since mirroring is on for UE A at the next hopping time (k+1), UE A uses an RU 505 in slot (k+1). Mirroring is off at hopping time (k+3) and thus UE A transmits data in an RU 506 identical to an RU used in the previous slot (k+2) in slot (k+3). Similarly, since mirroring is off at hopping time (k+6), UE A transmits data in an RU 507 identical to an RU transmitted in the previous slot (k+5) in slot (k+6).

In the same manner, an RU 508 is allocated to UE B in slot k in Cell B. Since mirroring is off at the next hopping time (k+1), UE B uses an RU 509 in slot (k+1). At hopping time (k+3), mirroring is on and thus UE B uses an RU 510 in slot (k+3). Similarly, since mirroring is on at hopping time (k+6), UE B uses an RU 511 in slot (k+6).

Mirroring is on or off at each hopping time in a different pattern in each cell. Therefore, while UEs within different cells may use the same RU in a given slot, the probability of the different cells using the same RU in the next slot decreases due to the use of different mirroring on/off patterns. For example, the RUs 504 and 508 are allocated respectively to UE A in Cell A and UE B in Cell B in slot k. If UE B is near to Cell A, UE B will likely significantly interfere with UE A. However, since UE A turns on mirroring at the next hopping time (k+1), UE A transmits data in the RU 505 in slot (k+1), whereas mirroring is off for UE B and thus UE B transmits data in the RU 509 identical to that used in the previous slot. Thus, UE A and UE B use different RUs in slot (k+1).

The mirroring method illustrated in FIG. 5B is similar to that illustrated in FIG. 5A in that different cells use different mirroring on/off patterns and the former method illustrated in 5B differs from the latter method illustrated in 5A in that an RU is mirrored with respect to an RU in the same HARQ process rather than with respect to an RU in the previous slot. In FIG. 5B, mirroring is on for a UE in a cell 513 (Cell A) at hopping time k. Thus, the UE uses an RU 518 to which an RU 517 used in the previous slot (k−RTT+1) of the same HARQ process is mirrored, instead of an RU to which an RU used in the previous slot (k−1) is mirrored. RTT represents Round Trip Time, defined as the time taken for an initial transmission in the case where a response for transmitted data is a Negative ACKnowledgment (NACK) and a response for retransmitted data is an ACK. Therefore, data transmitted in RUs 518 and 519 are retransmission versions of data transmitted in RUs 516 and 517 or belong to the same HARQ process as the data transmitted in the RUs 516 and 517. The HARQ RTT-based mirroring facilitates defining a mirroring on/off pattern in which different RUs are used for initial transmission and retransmission. Despite this advantage, management of a different mirroring on/off pattern for each HARQ process increases complexity. In this context, a mirroring on/off pattern is determined as follows.

(1) Mirroring is on/off at each hopping time according to a predetermined sequence. The sequence is needed to indicate whether mirroring is on or off, not to indicate the position of an RU for hopping. Therefore, the sequence is composed of two values. In general, a binary sequence is composed of 0 s or 1 s.

(2) A plurality of sequences are generated and allocated to cells such that different patterns are applied to at least neighbor cells to thereby minimize RU collision among them. For example, a set of orthogonal codes such as Walsh codes are allocated to respective cells and each cell determines mirroring on/off according to a code value 0 or 1 at each hopping time. Alternatively, each cell can determine mirroring on/off according to a Pseudo Noise (PN) sequence having a seed specific to the cell. As compared to the former method, the latter method increases randomization between cells and thus minimizes the phenomenon in which RUs hop in the same manner in different cells. In the context of the PN sequence-based method, the exemplary embodiment of the present invention will be described below.

For generation of a PN sequence, a cell-specific seed is used and to achieve the same PN sequence, UEs within the same cell should receive the same timing information. The timing information can be represented as the difference between an absolute time and a current time or as a common time frame count such as a System Frame Number (SFN).

Figure 6:
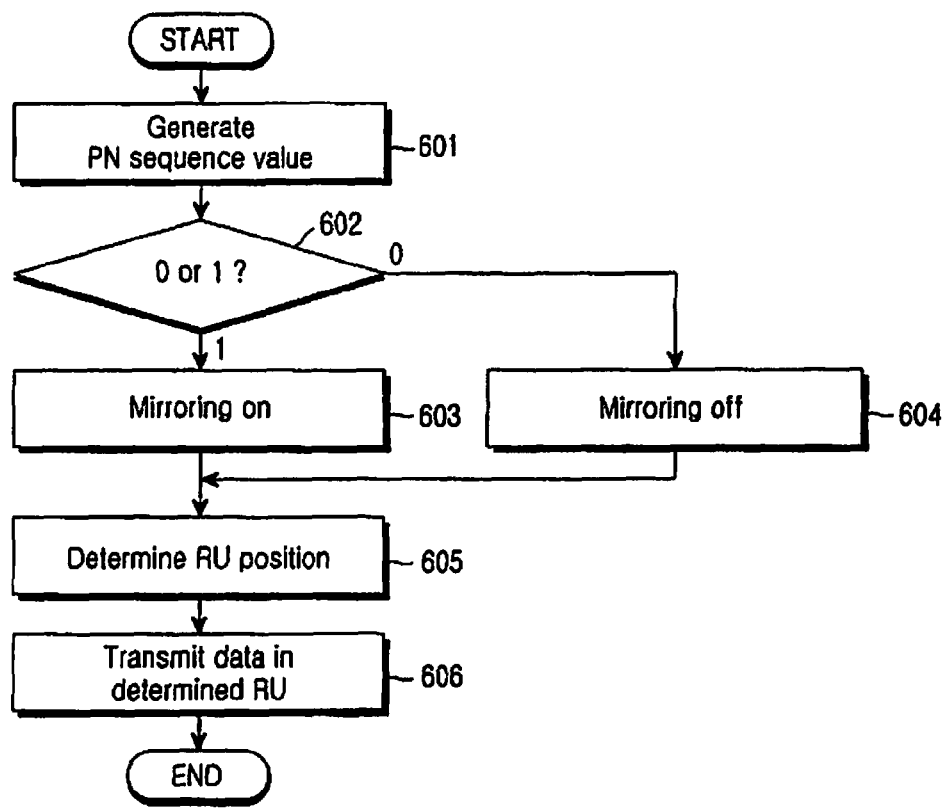
FIG. 6 is a flowchart of an operation for selecting RUs in a UE or a Node B according to the exemplary embodiment of the present invention.

FIG. 6 is a flowchart of an operation for determining mirroring on/off in a UE according to the exemplary embodiment of the present invention. To receive data from the UE, a Node B can perform the same operation.

Referring to FIG. 6, when the Node B schedules an RU for the UE, the UE generates a PN sequence value in step 601 and checks the PN sequence value in step 602. If the PN sequence value is 0, the UE turns mirroring off in step 604. If the PN sequence value is 1, the UE turns mirroring on in step 603. In step 605, the UE selects an RU for the next data transmission according to the mirroring-on/off decided in step 603 or 604. The UE transmits data in the selected RU in step 606.

Mirroring results in a symmetrical RU hopping with respect to the center of a total FH band. A new RU for use in the next slot can be detected based on information about an RU used in a previous slot. The mirroring is expressed as Equation (1):

$$H(r) = N_{FH} - r \quad (1)$$

where r denotes an RU being a mirroring base. The mirroring base is an RU used in the previous slot in FIG. 5A and an RU used in the previous slot of the same HARQ process in FIG. 5B. H(r) denotes an RU to which the mirroring base is mirrored in a slot. $N_{FH}$ denotes the total number of RUs in the FH band.

Figure 7:
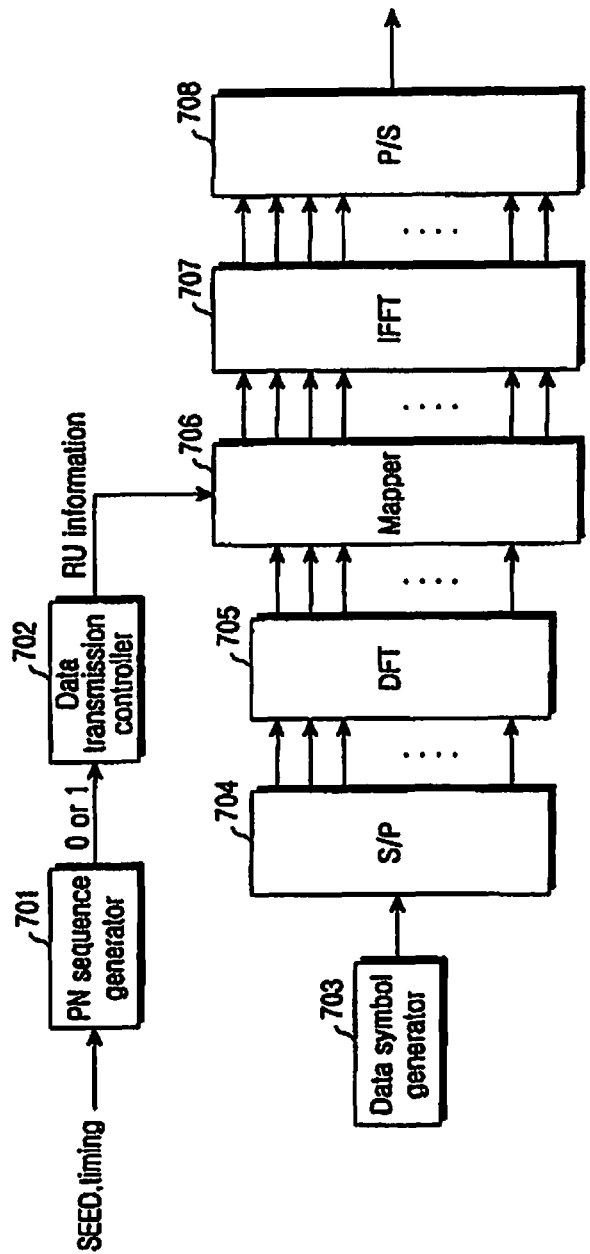
FIG. 7 is a block diagram of the UE according to an exemplary embodiment of the present invention.

FIG. 7 is a block diagram of the UE according to the exemplary embodiment of the present invention.

Referring to FIG. 7, a data symbol generator 703 generates data symbols to be transmitted. The amount of data transmittable in each Transmission Time Interval (TTI) is determined by Node B scheduling. A Serial-to-Parallel (S/P) converter 704 converts the sequence of the data symbols to parallel symbol sequences. A DFT processor 705 converts the parallel symbol sequences to frequency signals, for SC-FDMA transmission. A DFT size is equal to the number of the data symbols generated from the data symbol generator 703. A mapper 706 maps the frequency signals to frequency resources allocated to the UE based on RU information received from a data transmission controller 702. The data transmission controller 702 generates the RU information based on scheduled RU information and mirroring on/off information. Each cell has a different mirroring on/off pattern according to a PN sequence. Hence, a PN sequence generator 701 is required. An RU to be used is decided using the output of the PN sequence generator 701 in the afore-described method. An IFFT processor 707 converts the mapped signals to time signals. A Parallel-to-Serial (P/S) converter 708 converts the time signals to a serial signal for transmission.

Figure 8:
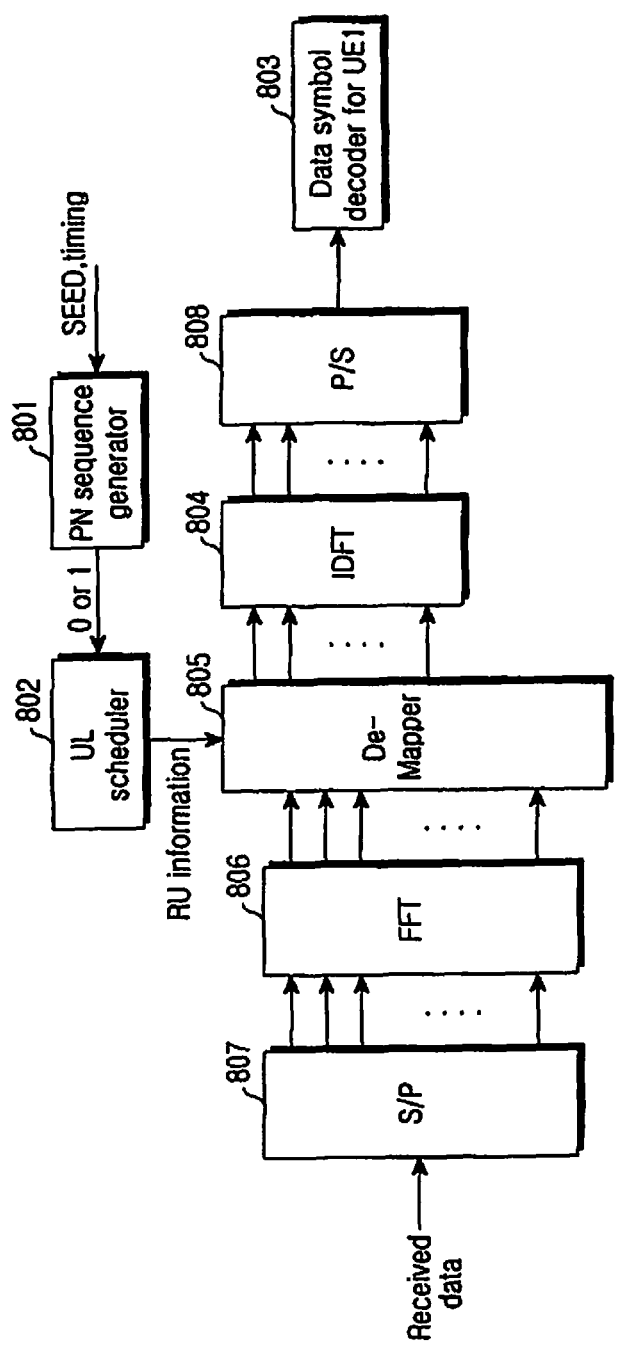
FIG. 8 is a block diagram of the Node B according to an exemplary embodiment of the present invention.

FIG. 8 is a block diagram of the Node B according to the exemplary embodiment of the present invention.

Referring to FIG. 8, an S/P converter 807 converts a received signal to parallel signals and an FFT processor 806 converts the parallel signals to frequency signals. A demapper 805 demaps the frequency signals for different UEs based on RU allocation information about each UE determined by an uplink scheduler 802. The uplink scheduler 802 generates the RU information for each UE using scheduled RU information and mirroring on/off information based on a mirroring on/off pattern. Since each cell has a different mirroring on/off pattern, a PN sequence generator 801 is needed. An RU from which data is to be extracted is decided based on the output of the PN sequence generator 801 in the afore-described method. An IDFT processor 804 converts the demapped signal of an intended UE, UE 1 to time signals. A P/S converter 808 converts the time signals to a serial signal. A data symbol decoder 803 demodulates data received from UE 1.

Embodiment 2

Inter-sub-FH band hopping on/off is combined with mirroring on/off, and the position of an RU for data transmission is determined by selecting one of the combinations such that each cell has a different pattern. That is, the resources of a total system frequency band is divided into an FH band and an FS band and a channel structure is proposed, which offers a sufficient frequency hopping gain in the FH band and achieves a sufficiently available frequency band in the FS band.

Figure 9:
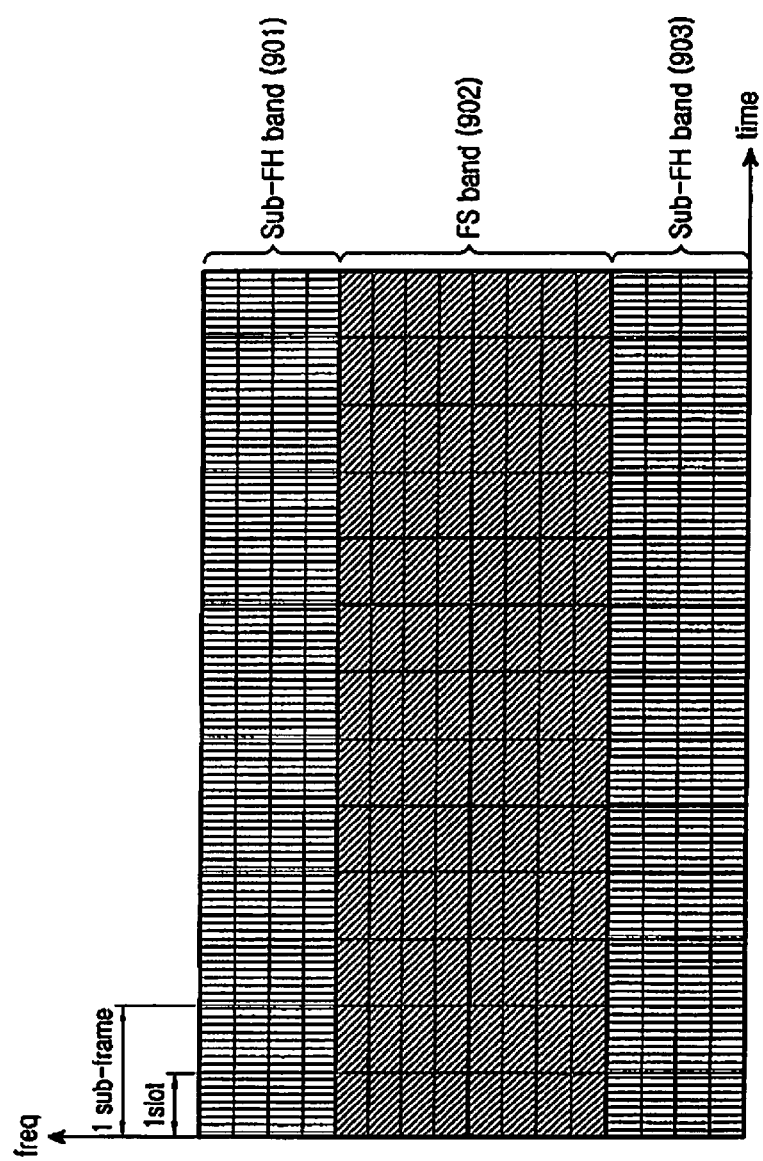
FIG. 9 illustrates a channel structure according to another exemplary embodiment of the present invention.

FIG. 9 illustrates the channel structure according to the second exemplary embodiment of the present invention.

Referring to FIG. 9, sub-FH bands 901 and 903 are defined at either side of a total frequency band and the center frequency band between the sub-FH bands 901 and 903 is defined as an FS band 902. UEs using the FS band 902 can hop to the sub-FH bands 901 and 903, thereby achieving a sufficient frequency hopping gain. As the frequencies of the FS band 902 are successive to maximize successive frequency allocation, a maximum data rate can be increased.

A method for performing inter-sub-FH band hopping and mirroring within each FH band in order to achieve a sufficient frequency diversity gain and simultaneously to enable variable RU allocation, taking into account the single carrier property in the proposed channel structure will now be described. As done in the first exemplary embodiment of the present invention, inter-sub-FH band hopping is on/off and mirroring is on/off at each hopping time according to a cell-specific pattern.

Four combinations of inter-sub-FH band hopping on/off and mirroring on/off are available as illustrated in Table 1. At each hopping time, one of the combinations is selected and hopping or/and mirroring apply to each cell using the selected combination in a different pattern.

TABLE 1

| Combination | FH band hopping | Mirroring |
|---|---|---|
| 1 | On | On |
| 2 | Off | Off |
| 3 | Off | On |
| 4 | On | Off |

FIGS. 10A to 10D describe the second exemplary embodiment of the present invention.

Figure 10A:
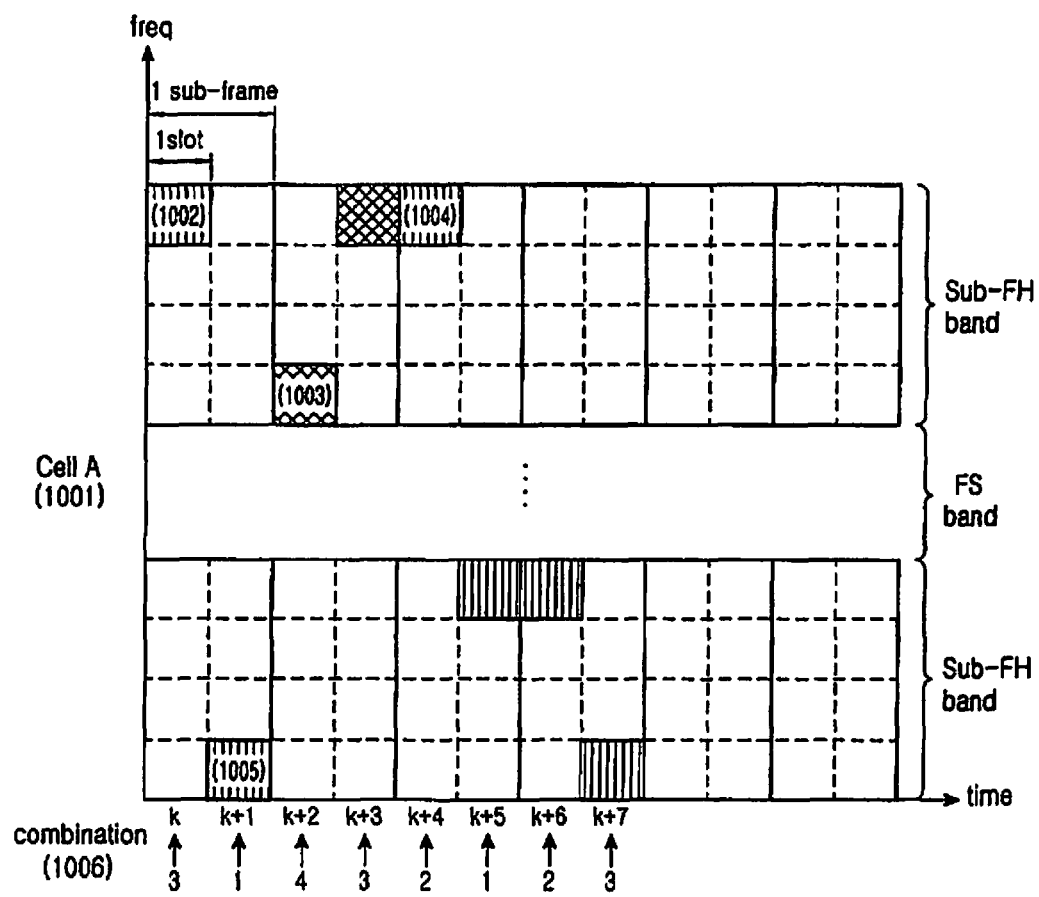
FIGS. 10A to 10D illustrate a method according to the second exemplary embodiment of the present invention.
Figure 10B:
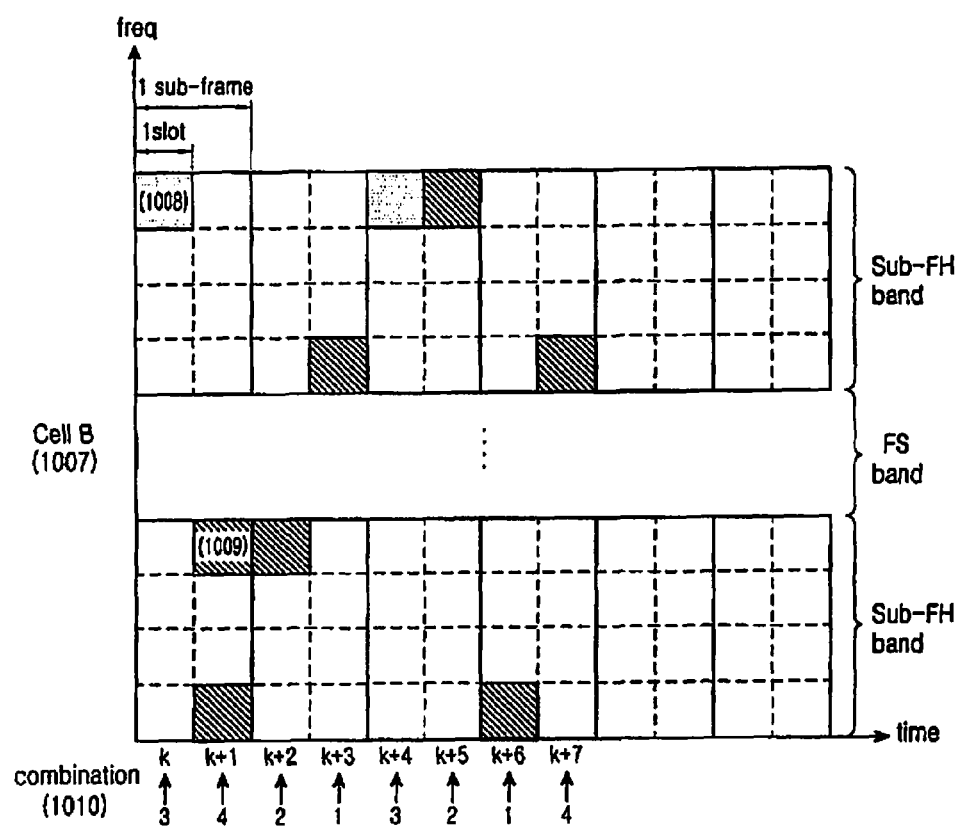

FIGS. 10A and 10B are based on the assumption that intra-TTI hopping is supported in cells 1001 and 1007 (Cell A and Cell B). Therefore, the hopping period is a slot.

Referring to FIGS. 10A and 10B, combinations of inter-sub-FH band hopping on/off and mirroring on/off according to Table 1 are selected in the order of 3-1-4-3-2-1-2-3 for Cell A and in the order of 3-4-2-1-3-2-1-4 for Cell B.

Although Cell A uses an RU 1002 at hopping time k, it selects an RU 1005 by inter-sub-FH band hopping and mirroring according to combination 1 at hopping time (k+1). At the next hoping time (k+2), Cell A performs only inter-sub-FH band hopping without mirroring according to combination 4 and thus selects an RU 1003. Since combination 2 is set for hopping time (k+4), Cell A selects an RU 1004 without inter-sub-FH band hopping and mirroring.

Cell B selects the same RU 1008 used for Cell A at hopping time k. At hopping time (k+1), Cell B selects an RU 1009 through inter-sub-FH band hopping only without mirroring according to combination 4, as compared to Cell A that selects the RU 1005 through both inter-sub-FH band hopping and mirroring according to combination 1. While another UE within Cell B may use the same RU as the RU 1005 in slot (k+1), interference from a different UE at each time rather than collision with the same UE offers a better interference randomization gain.

Figure 10C:
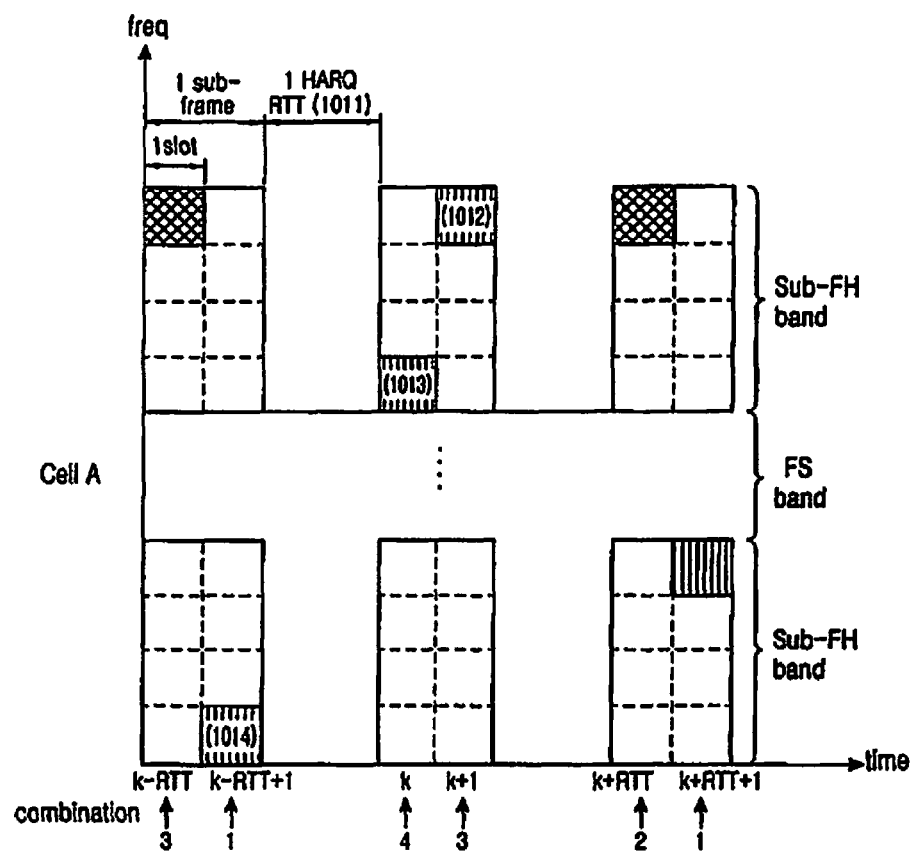
Figure 10D:
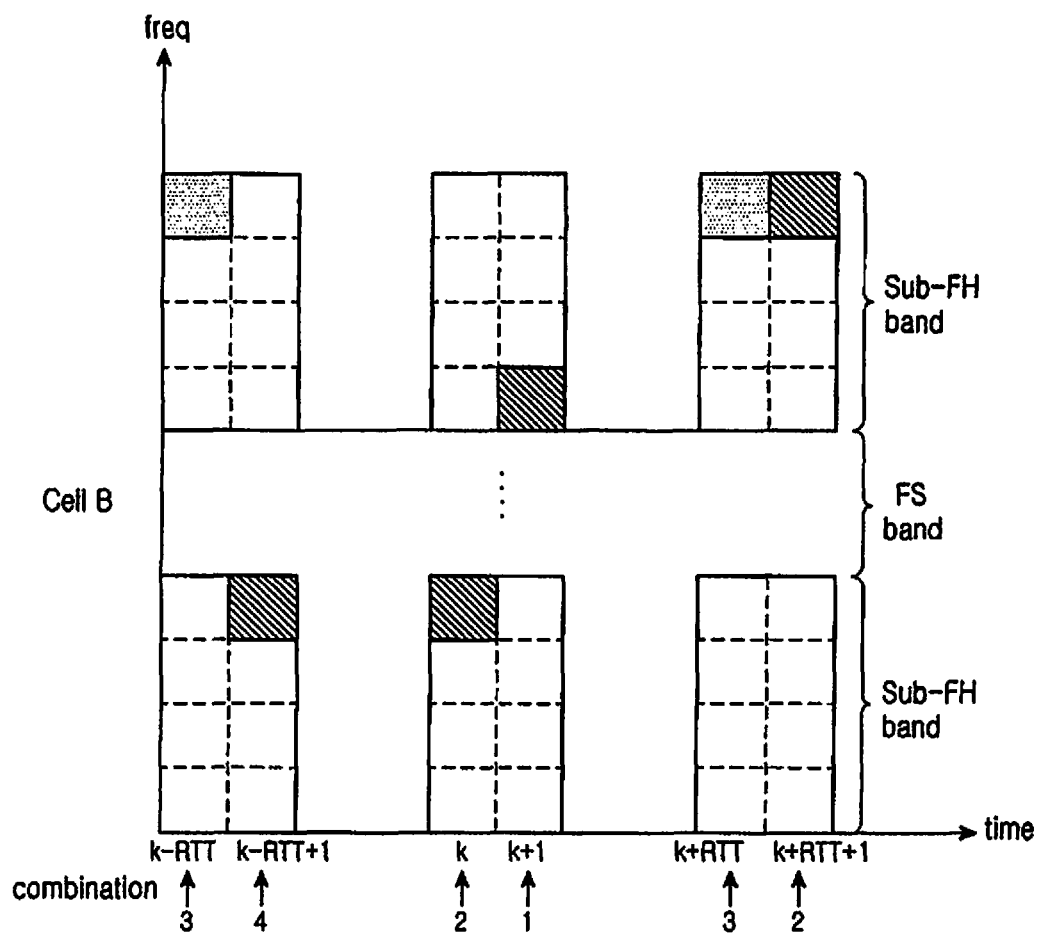

In the illustrated cases of FIGS. 10C and 10D, inter-sub-FH band hopping and mirroring are carried out with respect to an RU used for the previous data transmission of the same HARQ process, instead of an RU used at the previous hopping time.

Referring to FIG. 10C, an RU 1013 is selected at hopping time k by inter-sub-FH band hopping of an RU 1014 used for the previous data transmission of the same HARQ process, not of an RU used at hopping time (k−1). Combination 4 is set for hoping time k, which means inter-sub-FH band hopping is on and mirroring is off with respect to the RU 1014. Thus, the RU 1013 is selected at hopping time k. At hopping time (k+1) for which combination 3 is set, the RU 1013 is inter-sub-FH band-hopped and mirrored to an RU 1012.

A method for selecting combinations of inter-sub-FH band hopping on/off and mirroring on/off using a predetermined sequence will now be described.

(1) Since the sequence is needed to indicate combinations selected from the four combinations of inter-sub-FH band hopping on/off and mirroring on/off, but the sequence is not needed to indicate the position of an RU for hopping, four values are available in forming the sequence. In general, a quaternary sequence or two binary sequences in combination serves the purpose of indicating selected combinations. The sequence can be generated in a conventional method and thus a detailed description of the method is not provided herein.

(2) A plurality of sequences are generated and allocated to cells such that different patterns are applied to at least neighbor cells to thereby minimize RU collision among them. For example, a set of orthogonal codes such as Walsh codes are allocated to cells in a one-to-one correspondence and each cell selects a combination according to a sequence value at each hopping time. Alternatively, each cell can select a combination according to a PN sequence having a seed specific to the cell. As compared to the former method, the latter method increases randomization between cells and thus minimizes RUs hopping in the same manner in different cells. In the context of the PN sequence-based method, the exemplary embodiment of the present invention will be described below.

For generation of a PN sequence, a cell-specific seed is used and to achieve the same PN sequence, UEs within the same cell should receive the same timing information. The timing information can be represented as the difference between an absolute time and a current time or as a common time frame count such as an SFN.

Figure 11:
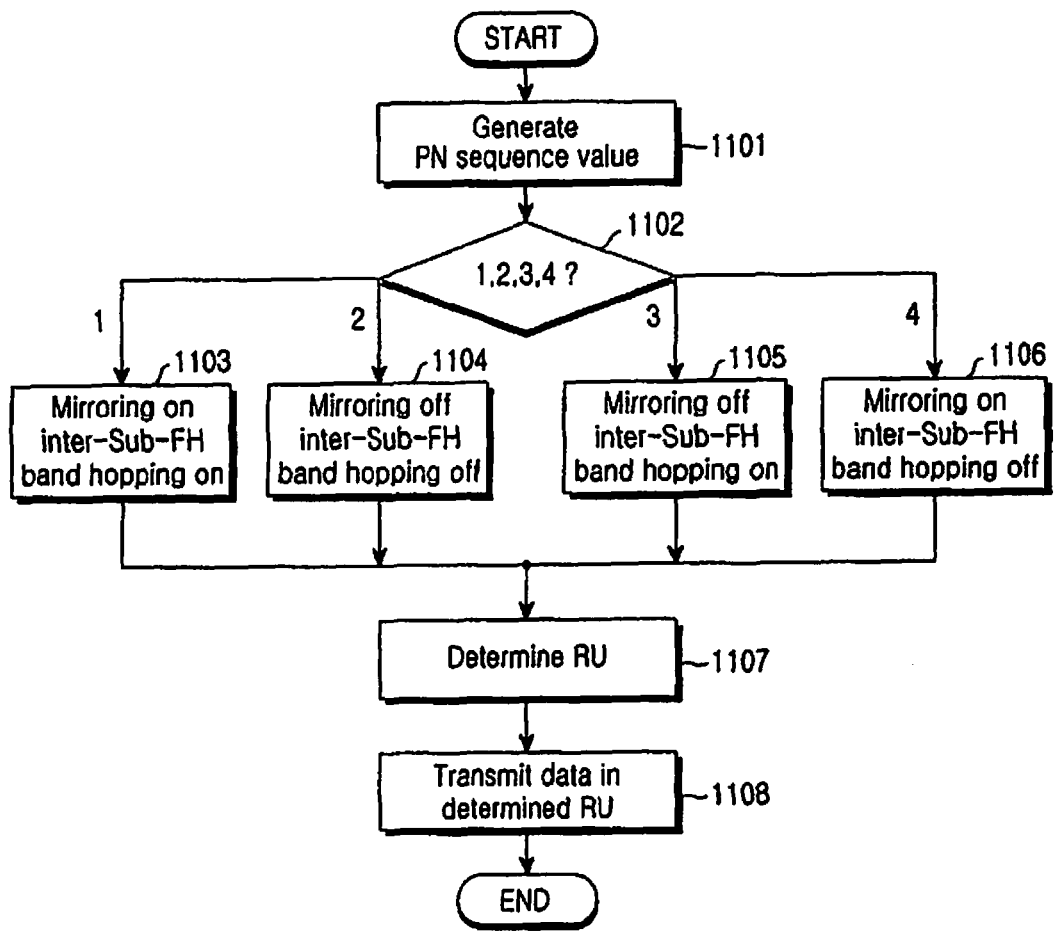
FIG. 11 is a flowchart of an operation for selecting RUs in the UE or the Node B according to the second exemplary embodiment of the present invention.

FIG. 11 is a flowchart of an operation of the UE according to the second exemplary embodiment of the present invention. The same operation applies to the Node B when it receives data from the UE.

Referring to FIG. 11, when the Node B schedules a specific RU for the UE, the UE generates a PN sequence value in step 1101 and determines whether the PN sequence value is 1, 2, 3, or 4 in step 1102. If the PN sequence value is 1, the UE selects a combination of mirroring-on and inter-sub-FH band hopping-on in step 1103. If the PN sequence value is 2, the UE selects a combination of mirroring-off and inter-sub-FH band hopping-off in step 1104. If the PN sequence value is 3, the UE selects a combination of mirroring-off and inter-sub-FH band hopping-on in step 1105. If the PN sequence value is 4, the UE selects a combination of mirroring-on and inter-sub-FH band hopping-off in step 1106. In step 1107, the UE selects an RU for data transmission by mirroring and/or hopping according to the selected combination. The UE transmits data in the selected RU in step 1108.

A transmitter and a receiver according to the second exemplary embodiment of the present invention have the same configurations as those according to the first exemplary embodiment of the present invention, except that the PN sequence generators 701 and 802 generate one of four values 1 to 4 and provide the generated value to the data transmission controller 702 and the uplink scheduler 802 so as to determine the position of an RU.

Embodiment 3

Figure 12:
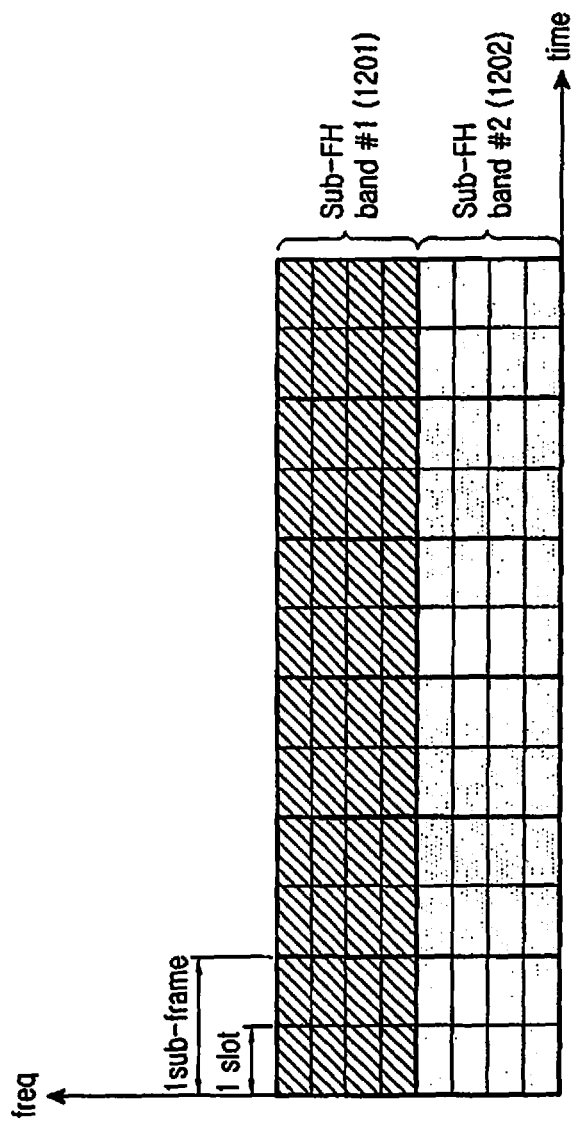
FIG. 12 illustrates a channel structure according to a third exemplary embodiment of the present invention.

FIG. 12 illustrates a channel structure according to a third exemplary embodiment of the present invention.

For a system where a plurality of sub-FH bands exist as illustrated in FIG. 12 and where hopping always occurs between the sub-FH bands, a method is proposed for determining mirroring on/off according to a different pattern for each cell. The use of different mirroring on/off patterns for different cells decreases the probability of performing mirroring at the same time in the different cells, thus resulting in maximized randomization of inter-cell interference.

Figure 13:
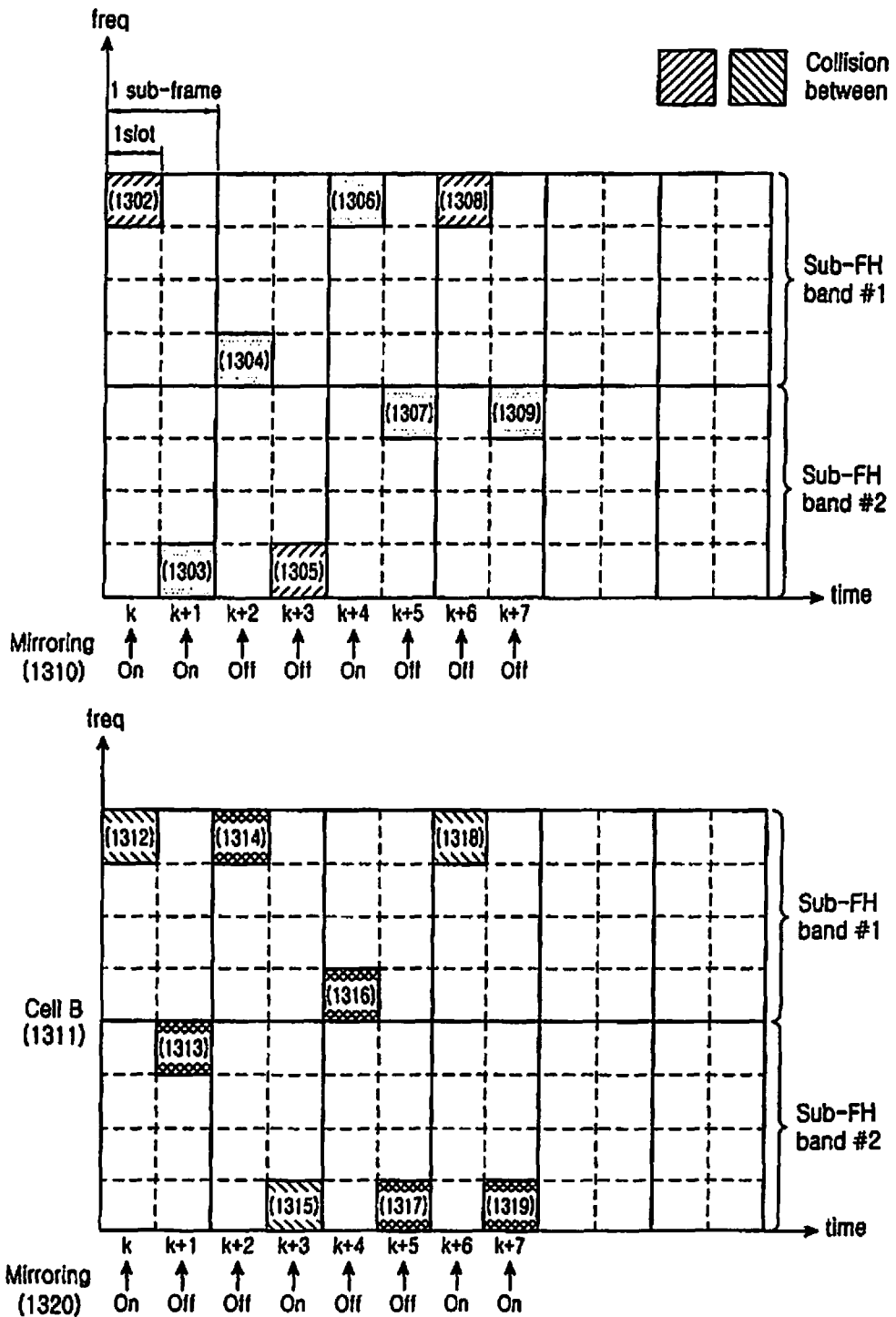
FIG. 13 illustrates a method for performing mirroring irrespective of Hybrid Automatic Repeat reQuest (HARQ) according to the third exemplary embodiment of the present invention.
Figure 14:
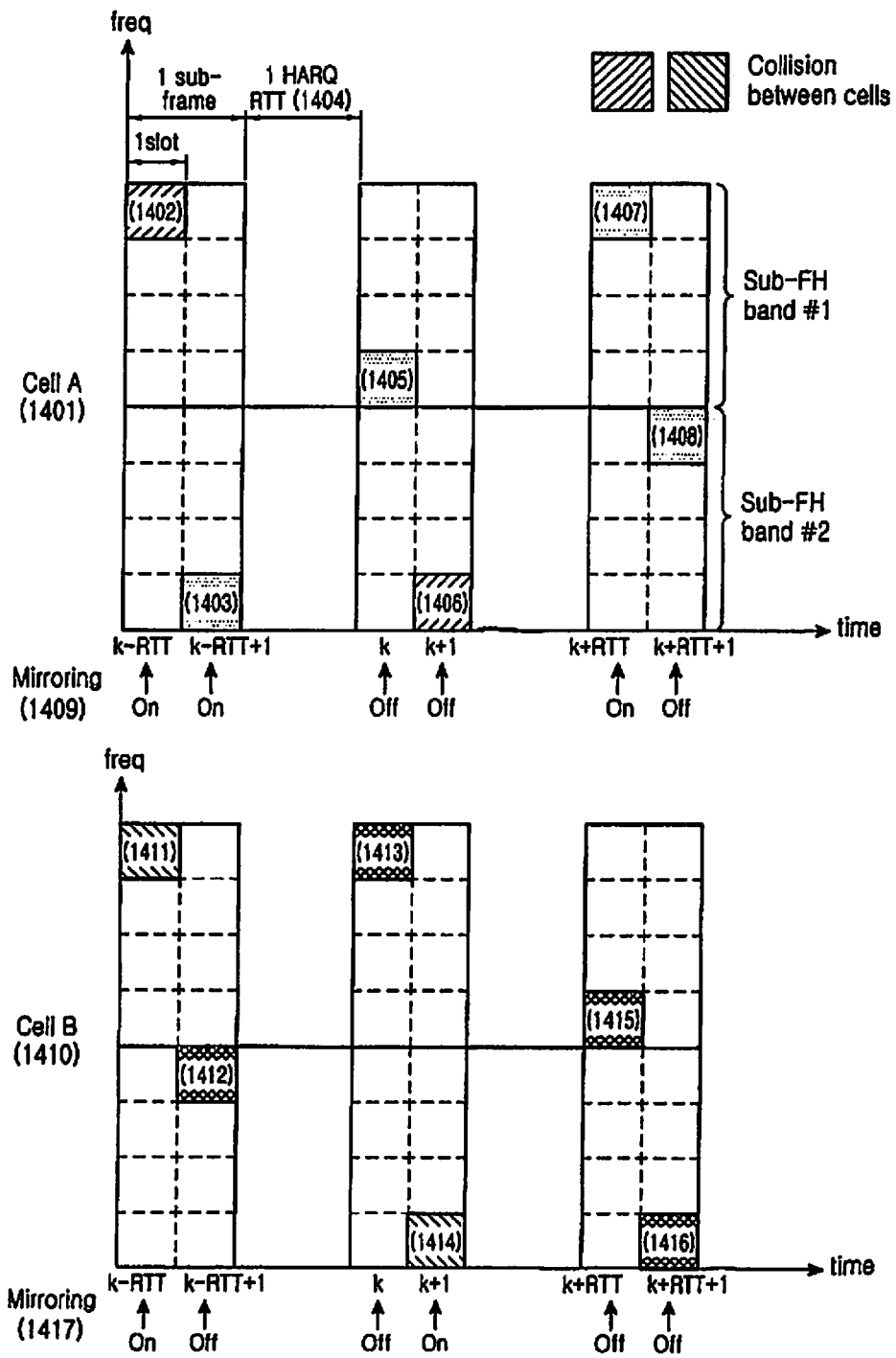
FIG. 14 illustrates a method for performing mirroring for each HARQ process according to the third exemplary embodiment of the present invention.

FIGS. 13 and 14 describe a method according to a third exemplary embodiment of the present invention. Specifically, FIG. 13 illustrates a mirroring method independent of HARQ and FIG. 14 illustrates a method for performing mirroring on an HARQ process basis.

Referring to FIG. 13, since it is assumed that both cells 1301 and 1311 (Cell A and Cell B) support intra-subframe hopping, the hopping period is a slot. Mirroring is performed at each hopping time in a pattern 1310 of on, on, off, off, on, off, off, off . . . in Cell A, and in a pattern 1320 of on, off, off, on, off, off, on, on, . . . in Cell B.

If an RU 1302 in sub-FH band #1 is allocated to a UE at hopping time k in Cell A, it hops to sub-FH band #2 occurs because inter-sub-FH band hopping applies always and is mirrored according to the mirroring pattern 1310. Hence, the UE uses an RU 1303 in slot (k+1). At the next hopping time (k+2), the UE selects an RU 1304 through hopping to sub-FH band #1 and mirroring-off. Since hopping to sub-FH band #2 occurs and mirroring is off at the next hopping time (k+3), the UE uses an RU 1305 in slot (k+3).

Compared to Cell A, a different mirroring on/off pattern is defined for Cell B. In other words, mirroring is on/off in a different manner at each hopping time for each cell. Although Cell A and Cell B may select the same RU at a given hopping time, the third exemplary embodiment of the present invention reduces the probability of selecting the same RU at the next hopping time in the two cells.

For instance, in the case where the same RUs 1302 and 1312 are allocated respectively to UE A in Cell A and UE B in Cell B for a predetermined time, if UE B is near to Cell A, UE A is probable to be interfered significantly by UE B at hopping time k. However, since Cell A performs both inter-sub-FH band hopping and mirroring at the next hopping time (k+1), UE A transmits data in the RU 1303 in slot (k+1), whereas inter-sub-FH band hopping is on and mirroring is off for UE B and thus UE B transmits data in an RU 1313 in slot (k+1). Thus, UE A and UE B use different RUs in slot (k+1), thus avoiding continual interference from the same UE.

The mirroring method illustrated in FIG. 14 is similar to that illustrated in FIG. 13 in that mirroring follows inter-sub-FH band hopping and different cells use different mirroring on/off patterns, and the former differs from the latter in that an RU is mirrored with respect to an RU in the same HARQ process rather than with respect to an RU used at the previous transmission time.

That is, at hopping time (k+RTT), a UE in a cell 1401 (Cell A) uses an RU 1407 to which an RU 1406 used in slot (k+1) of the same HARQ process is mirrored, instead of an RU to which an RU used in the previous slot (k+RTT−1) is mirrored.

The HARQ RTT-based mirroring facilitates defining a mirroring on/off pattern in which different RUs are used for initial transmission and retransmission, thereby maximizing an interference diversity effect.

The UE determines mirroring on/off in the same manner as in the first exemplary embodiment of the present invention, except that inter-sub-FH band hopping occurs all the time in selecting an RU.

To realize the third exemplary embodiment of the present invention, a hopping pattern formula is given as Equation (2), for example. The UE is aware of a resource block to be used at each transmission time using the hopping pattern formula and the index of a scheduled resource block. Equation (2) uses sub-band-based shifting for inter-subband hopping.

$$O_s = f\_s - N_o \cdot h(t), \; O_s = O_s \bmod N\_RB$$

$$\text{if } 0 \leq O_s < N_s$$

$$f_{hop}(i) = N_o \cdot h(i) + O_s + \{(N_s - 1) - 2 \times (O_s \bmod(N_s))\} \times m(i)$$

$$f_{hop}(i) = f_{hip}(i) \bmod N\_RB$$

$$\text{else if } N_s \leq O_s$$

$$f_{hop}(i) = N_o \cdot h(i) + O_s + \{(N_o - 1) - 2 \times ((O_s - N_s) \bmod(N_o))\} \times m(i)$$

$$f_{hop}(i) = f_{hop}(i) \bmod N\_RB \quad (2)$$

where $O_s$ denotes an offset by which a resource block scheduled to the UE is spaced from a cyclic shift reference point, $f\_s$ denotes the index of a resource block allocated by a scheduling grant, $h(t)$ denotes the degree to which the scheduled resource block is cyclically shifted at scheduling time (t), $f_{hop}(i)$ denotes the index of a resource block after hopping at hopping time (i), N_RB denotes the total number of resource blocks available for data transmission, and $N_o$ and $N_s$ are maximum numbers of resources blocks that can be scheduled for UEs that perform hopping.

If the total number of resource blocks N_RB is not a multiple of the number of subbands M, a particular subband has a fewer number of resource blocks, $N_s$ than that of the resource blocks of the other subbands each $N_o$. Because Equation (2) assumes that only one subband has a fewer number of resource blocks, $N_o$ and $N_s$ are computed by Equation (3):

$$N_o = \left\lceil \frac{N\_RB}{M} \right\rceil, \quad N_s = N\_RB - (M - 1) \times N_o \quad (3)$$

In Equation (2), h(i) denotes a cyclic shift degree, being one of $\{0, 1, \ldots M\}$ selected according to a bit value of a random sequence. $h(0)=0$. $m(i)$ is a parameter that determines mirroring on/off at hopping time (i), being one of $\{0, 1\}$. $m(i)$ is selected according to a bit value of a random sequence, or by $h(i)=x/2$ and $m(i)=x\bmod(2)$ where x is one of $\{0, 1, \ldots M\}$ selected according to the bit value of the random sequence. If $m(i)=0$, mirroring is off and if $m(i)=1$, mirroring is on.

To describe Equation (2) in great detail, the offset $O_s$ at the scheduling time of the scheduled resource block, is first calculated by the first line of Equation (2). $O_s$ indicates how far a cyclically shifted resource block is spaced from the cyclic shift reference point.

$O_s$ is introduced for the following reason. When the total number of resource blocks N_RB is not a multiple of the number of subbands M, the subbands do not have the same amount of resources, causing failed inter-subband hopping. Therefore, subbands are formed such that one subband has a fewer number of resource blocks $N_o$ than the number $N_s$ of resources blocks of each of the other subbands and $O_s$ is used to indicate the subband having the fewer number of resource blocks to the UE in the third exemplary embodiment of the present invention.

For example, if N_RB is 22 and M is 4, subbands can be configured so that a first subband has four resource blocks and each of the other subbands has six resource blocks. In this subband structure, if $O_s$ is less than 4, the UE is aware that the scheduled resource block resides in the smaller subband.

According to the first conditional sentence of Equation (2), then, the scheduled resource block is cyclically shifted with respect to resource blocks 0 to $N_s - 1$ according to the offset $O_s$ and then mirrored within $N_s$ resource blocks. If $m(i)=0$, mirroring is off.

If $O_s$ is larger than $N_s$, which implies that the scheduled resource block resides in a normal subband, a cyclic shift is performed according to the second conditional sentence of Equation (2) and then mirroring is performed within $N_o$ resource blocks. If $m(i)=0$, mirroring is off.

Depending on a subband configuration, a plurality of subbands may each have $N_s$ resource blocks with a plurality of remaining subbands each having $N_o$ resource blocks. For example, if four subbands are given, two subbands each have five resources blocks and the other two subbands each include six resource blocks. This case can be easily realized by modifying the conditional sentences of Equation (2) that indicate a scheduled subband using an offset.

Embodiment 4

If mirroring is on or off according to a random pattern in each cell, successive mirroring ons/offs increase the probability of data transmission from UEs in the same RUs in different cells. Considering that it is preferred, in terms of channel quality, to achieve a sufficient frequency diversity at each transmission time when data is transmitted by an HARQ process, it is necessary to allow UEs to select different RUs at least under a successive data transmission situation such as initial transmission and retransmission. To do so, a fourth exemplary embodiment of the present invention proposes a limited use of a method for generating a random mirroring pattern and determining mirroring on/off according to the random mirroring pattern, when needed. When both intra-subframe hopping and inter-subframe hopping are supported, mirroring is always on at each hopping time for one of the two hopping schemes and mirroring is on/off in a random mirroring on/off pattern for the other hopping scheme.

Figure 15:
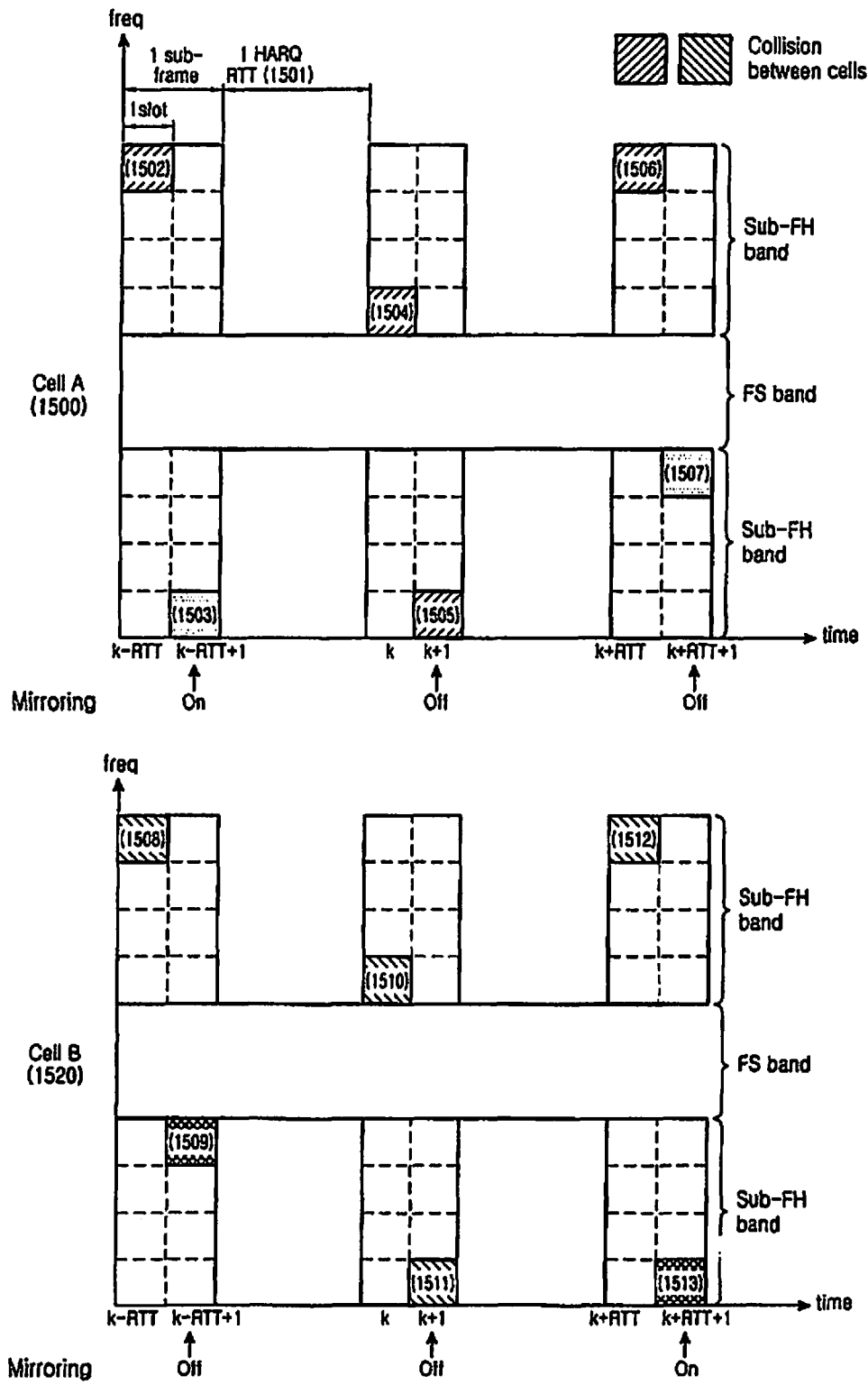
FIG. 15 illustrates a method for performing mirroring for each HARQ process according to a fourth exemplary embodiment of the present invention.

FIG. 15 illustrates a method for always turning on mirroring for inter-subframe hopping and determining mirroring on/off according to a random mirroring on/off pattern for intra-subframe hopping according to the fourth exemplary embodiment of the present invention.

As in the second exemplary embodiment of the present invention, sub-FH bands are positioned at either side of a system frequency band and an FS band is interposed at the center frequency band between the sub-FH bands. To achieve a frequency diversity gain, an RU hops between the sub-FH bands at each hopping time as in the third exemplary embodiment of the present invention.

Referring to FIG. 15, mirroring occurs at each intra-subframe hopping time according to a pattern of on, off, off, ... in a cell 1500 (Cell A) and according to a pattern of off, off, on, ... in a cell 1520 (Cell B).

When an RU 1502 is allocated to a UE at hopping time (k−RTT) in Cell A, the UE selects an RU 1503 by mirroring according to the mirroring on/off pattern at the next hopping time (k−RTT+1). At hopping time k being the next transmission time of the same HARQ process, mirroring is always on. To select an RU at a different position from an RU transmitted at the previous transmission time of the same HARQ process, an RU 1504 is selected by mirroring the RU 1502 used in the first slot (k−RTT) of the previous HARQ transmission time. Since mirroring is off according to the mirroring on/off pattern at the next hopping time (k+1), the UE selects an RU 1505. At hopping time (k+RTT) being the next transmission time of the same HARQ process, mirroring is always on. To select an RU at a different position from an RU transmitted at the previous HARQ transmission time, the RU 1504 is mirrored to an RU 1506. Since mirroring is off according to the mirroring on/off pattern at the next hopping time (k+RTT+1), the UE selects an RU 1507.

In the same manner, an RU hops to another sub-FH band by turning on/off mirroring according to a random mirroring on/off pattern at each intra-subframe hopping time in Cell B. That is, if an RU 1508 is used in slot (k−RTT), an RU 1509 is selected by turning off mirroring according to the mirroring on/off pattern at the next hopping time (k−RTT+1). Since mirroring is performed with respect to the RU 1508 used at the previous transmission time of the same HARQ process at the next HARQ transmission time, an RU 1510 is selected at hopping time k. At hopping time (k+1), mirroring is off according to the mirroring on/off pattern and thus an RU 1511 is selected. Since mirroring is performed with respect to the RU 1510 used at the previous transmission time of the same HARQ process at the next HARQ transmission time, an RU 1512 is selected at hopping time (k+RTT). At hopping time (k+RTT+1), mirroring is on according to the mirroring on/off pattern and thus an RU 1513 is selected.

As is apparent from the above description, the present invention advantageously randomizes inter-cell interference, increasing a frequency diversity effect, by turning on or off mirroring at each hopping time according to a different mirroring on/off pattern in each cell.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting data by a user equipment (UE) in a communication system, the method comprising:
receiving resource information from a node B;
identifying an inter-subframe hopping;
determining a hopping parameter;
determining a mirroring parameter;
determining a resource for data transmission based on the resource information, the hopping parameter, and the mirroring parameter; and
transmitting the data using the resource for data transmission,
wherein the hopping parameter and the mirroring parameter are determined based on a same hybrid automatic retransmission request (HARQ) process for a subframe, if the inter-subframe hopping is identified.

2. The method of claim 1, wherein the hopping parameter and the mirroring parameter are determined for a subframe, if the inter-subframe hopping is identified.

3. The method of claim 1, wherein the hopping parameter and the mirroring parameter are defined based on a random sequence comprising binary value.

4. The method of claim 3, wherein the random sequence is obtained from cell specific information.

5. The method of claim 1, further comprising:
identifying at least one sub-band for determining the resource for data transmission.

6. An apparatus of a user equipment (UE) for transmitting data in a communication system, the apparatus comprising:
a data transmission controller configured to receiving resource information from a node B, identify an inter-subframe hopping, determine a hopping parameter, determine a mirroring parameter, and determine a resource for data transmission based on the resource information, the hopping parameter, and the mirroring parameter; and
a transmitter configured to transmit the data using the resource for data transmission,
wherein the hopping parameter and the mirroring parameter are determined based on a same hybrid automatic retransmission request (HARQ) process for a subframe, if the inter-subframe hopping is identified.

7. The apparatus of claim 6, wherein the hopping parameter and the mirroring parameter are determined for a subframe, if the inter-subframe hopping is identified.

8. The apparatus of claim 6, wherein the hopping parameter and the mirroring parameter are defined based on a random sequence comprising binary value.

9. The apparatus of claim 8, wherein the random sequence is obtained from cell specific information.

10. The apparatus of claim 6, wherein the data transmission controller is configured to identify at least one sub-band for determining the resource for data transmission.

11. A method for receiving data by a node B in a communication system, the method comprising:
transmitting resource information to a user equipment (UE);
identifying an inter-subframe hopping;
determining a hopping parameter;
determining a mirroring parameter;
determining a resource for data transmission based on the resource information, the hopping parameter, and the mirroring parameter; and
receiving the data using the resource for data transmission,
wherein the hopping parameter and the mirroring parameter are determined based on a same hybrid automatic retransmission request (HARQ) process for a subframe, if the inter-subframe hopping is identified.

12. The method of claim 11, wherein the hopping parameter and the mirroring parameter are determined for a subframe, if the inter-subframe hopping is identified.

13. The method of claim 11, wherein the hopping parameter and the mirroring parameter are defined based on a random sequence comprising binary value.

14. The method of claim 13, wherein the random sequence is obtained from cell specific information.

15. The method of claim 11, further comprising:
identifying at least one sub-band for determining the resource for data transmission.

16. An apparatus for transmitting data, the apparatus comprising of:
a transceiver configured to transmit resource information to a user equipment (UE) and receive the data using a resource for data transmission; and
a controller configured to identify an inter-subframe hopping, determine a hopping parameter, determine a mirroring parameter, and determine a resource for data transmission based on the resource information, the hopping parameter, and the mirroring parameter, wherein the hopping parameter and the mirroring parameter are determined based on a same Hybrid Automatic Retransmission request (HARQ) process for a subframe, if the inter-subframe hopping is identified.

17. The apparatus of claim 16, wherein the hopping parameter and the mirroring parameter are determined for a subframe, if the inter-subframe hopping is identified.

18. The apparatus of claim 16, wherein the hopping parameter and the mirroring parameter are defined based on a random sequence comprising binary value.

19. The apparatus of claim 18, wherein the random sequence is obtained from cell specific information.

20. The apparatus of claim 16, wherein the controller is configured to identify at least one sub-band for determining the resource for data transmission.

* * * * *